United States Patent
Sexton

(10) Patent No.: US 9,098,941 B2
(45) Date of Patent: Aug. 4, 2015

(54) SYSTEMS AND METHODS FOR GRAPHICAL LAYOUT

(75) Inventor: Harlan Sexton, Palo Alto, CA (US)

(73) Assignee: Ayasdi, Inc., Menlo Park, CA (US)

( * ) Notice: Subject to any disclaimer, the term of this patent is extended or adjusted under 35 U.S.C. 154(b) by 171 days.

(21) Appl. No.: 13/356,591

(22) Filed: Jan. 23, 2012

(65) Prior Publication Data
US 2013/0187922 A1 Jul. 25, 2013

(51) Int. Cl.
*G06T 11/20* (2006.01)

(52) U.S. Cl.
CPC .................................. *G06T 11/206* (2013.01)

(58) Field of Classification Search
CPC ..... G06T 11/206; G06T 11/20; G06F 3/0481; G06F 17/246
See application file for complete search history.

(56) References Cited

U.S. PATENT DOCUMENTS

| 5,734,268 | A  | * | 3/1998  | Bockelman ................. 324/601 |
|---|---|---|---|---|
| 6,169,817 | B1 | * | 1/2001  | Parker et al. ................. 382/131 |
| 6,362,820 | B1 | * | 3/2002  | Hoppe ........................... 345/423 |
| 6,583,787 | B1 |   | 6/2003  | Pfister et al. |
| 6,947,386 | B2 | * | 9/2005  | Temudo de Castro et al. ............ 370/238 |
| 7,176,919 | B2 |   | 2/2007  | Drebin et al. |
| 7,202,877 | B2 |   | 4/2007  | Olson |
| 7,496,650 | B1 | * | 2/2009  | Previdi et al. ................ 709/223 |
| 7,574,409 | B2 | * | 8/2009  | Patinkin ....................... 706/12 |
| 7,624,386 | B2 |   | 11/2009 | Robison |
| 7,719,960 | B2 | * | 5/2010  | Atlas et al. .................... 370/222 |
| 7,830,786 | B2 | * | 11/2010 | Atlas et al. .................... 370/217 |
| 8,355,864 | B2 | * | 1/2013  | Kida et al. .................... 701/446 |
| 8,527,503 | B2 | * | 9/2013  | Tretjakov et al. ............. 707/716 |
| 8,744,770 | B2 | * | 6/2014  | Samet et al. .................. 701/540 |
| 8,811,199 | B2 | * | 8/2014  | Nixon et al. .................. 370/252 |
| 8,830,254 | B2 | * | 9/2014  | Noon ............................ 345/589 |
| 2002/0196292 | A1 | * | 12/2002 | Itoh et al. ..................... 345/853 |
| 2003/0011601 | A1 | * | 1/2003  | Itoh et al. ..................... 345/440 |
| 2003/0033582 | A1 | * | 2/2003  | Klein et al. ....................... 716/4 |
| 2003/0076319 | A1 | * | 4/2003  | Hiraga ......................... 345/420 |

(Continued)

FOREIGN PATENT DOCUMENTS

EP 0631251 12/1994

OTHER PUBLICATIONS

Mozes, Exact Oracles for Planar Graphs, 2011.*

(Continued)

*Primary Examiner* — Devona Faulk
*Assistant Examiner* — Charles L Beard
(74) *Attorney, Agent, or Firm* — Sheppard, Mullin, Richter & Hampton LLP

(57) ABSTRACT

In some embodiments, a method includes selecting a first and a second predetermined number of points of graphical data; determining an initial distance between each of the first predetermined number of points, generating a fast approximate distance oracle comprising identifiers of points and oracle distances between at least one point and another point, determining a graphical distance for each of the second predetermined number of points relative to other points of the first and second predetermined number of points, calculating a potential error between the determined graphical distance and a topologic distance between each of the second predetermined number of points, approximating a correction for at least one of the second predetermined number of points, adjusting a position of the at least one of the second predetermined number of points, and displaying the at least one of the second predetermined number of points.

23 Claims, 12 Drawing Sheets

(56) References Cited

U.S. PATENT DOCUMENTS

| | | | |
|---|---|---|---|
| 2003/0158855 A1* | 8/2003 | Farnham et al. | 707/102 |
| 2003/0174165 A1 | 9/2003 | Barney | |
| 2005/0035976 A1 | 2/2005 | Ecob et al. | |
| 2005/0228584 A1* | 10/2005 | Adachi et al. | 701/208 |
| 2008/0094399 A1* | 4/2008 | Heinkel et al. | 345/440 |
| 2009/0138188 A1* | 5/2009 | Kores et al. | 701/117 |
| 2009/0238187 A1* | 9/2009 | Guha et al. | 370/392 |
| 2010/0153870 A1 | 6/2010 | Hoffmann | |
| 2010/0302249 A1* | 12/2010 | Fowler et al. | 345/440 |
| 2010/0313157 A1* | 12/2010 | Carlsson et al. | 715/769 |
| 2011/0149100 A1 | 6/2011 | Narabu | |
| 2011/0208429 A1* | 8/2011 | Zheng et al. | 701/209 |
| 2011/0251789 A1* | 10/2011 | Sanders et al. | 701/202 |
| 2012/0136575 A1* | 5/2012 | Samet et al. | 701/540 |
| 2012/0144372 A1 | 6/2012 | Ceze et al. | |
| 2012/0182298 A1* | 7/2012 | Sun | 345/423 |
| 2012/0254153 A1* | 10/2012 | Abraham et al. | 707/716 |
| 2012/0280999 A1* | 11/2012 | Nachmanson et al. | 345/440 |
| 2012/0283948 A1* | 11/2012 | Demiryurek et al. | 701/533 |
| 2013/0191416 A1 | 7/2013 | Lee et al. | |

OTHER PUBLICATIONS

Zhang, Methods and Implementations of Road-Network Matching, 2010.*
Xiong, Semiautomated matching for network database intergration, 2004.*
Ham, Interactive Visualization of Small World Graphs, 2004.*
Ham, Interactive Visualization of Large Graphs, 2005.*
Sommer, Distance Oracles for Sparse Graphs, 2009.*
Grisetti, A Tree Parameterization for Efficiently Computing Maximum Likelihood Maps using Gradient Descent, 2007.*
Kawarabayashi, Linear-Space Approximate Distance Oracles for Planar Bounded-Genus and Minor-Free Graphs, 2011.*
Thorup, Approximate Distance Oracles, 2005.*
Rojas, Neutral Networks: A Systematic Intoduction, 1996, pp. 151-184 (The Backpropagation Algorithm, 2007).*
Hillier, Working With ArcView 10, 2011.*
Thorup et al., Approximate Distance Oracles, 2005.*
Feigenbaum et al., Graph Distances in the Data-Stream Model, 2008.*
Thorup, Approximate Distance Oracles, 2004.*
Sankaranarayanan, Query Processing Using Distance Oracles for Spatial Networks, 2010.*
Sankaranarayanan, Distance Oracles for Spatial Networks, 2009.*
Baswana, Faster Algorithms for Approximate Distance Oracles and All-Pairs Small Stretch, 2006.*
Thorup, Compact Oracles for Reachability and Approximate Distances in planar Digraphs, 2004.*
International Application No. PCT/US2013/022792, International Search Report and Written Opinion mailed Apr. 2, 2013.
International Application No. PCT/US2013/022803, International Search Report and Written Opinion mailed Apr. 2, 2013.
Civril, Ali et al., "SDE: Graph Drawing Using Spectral Distance Embedding," Proceedings of the 14th International Conference on Graph Drawing, pp. 30-41, Sep. 2006.
Gajer, Pawel et al., "A Multi-Dimensional Approach to Force-Directed Layouts of Large Graphs," Special Issue on the 10th Fall Workshop on Computational Geometry, vol. 29, No. 1, pp. 3-18, Sep. 2004.
Kamada, Tomihisa et al., "An Algorithm for Drawing General Undirected Graphs," Information Processing Letters, vol. 31, No. 1, pp. 7-15, Apr. 12, 1989.

* cited by examiner

| Vertices | Adjacent Vertices |
|---|---|
| 1 | 2, 10 |
| 2 | 1, 3 |
| 3 | 2, 4 |
| 4 | 3, 5 |
| 5 | 4, 6 |
| 6 | 5, 7 |
| 7 | 6, 8 |
| 8 | 7, 9 |
| 9 | 8, 10 |
| 10 | 1, 9 |
| ⋮ | ⋮ |

FIG. 1

SYSTEMS AND METHODS FOR GRAPHICAL LAYOUT

BACKGROUND

1. Field of the Invention

The present invention generally relates to graphical layout. More particularly, the invention relates to systems and methods for improved efficiency of the layout of graphical information.

2. Description of Related Art

As the amount and complexity of data increases, there is a need to better explain the data content and as well as potential relationships suggested by the data. One way in which massive data may be described is through the use of graphs. A graph is any visual representation of information or of relationships between quantities, qualities, or sets of data.

A popular graph used to depict data is the force-directed layout graph. The force-based or force-directed graph utilizes force-directed algorithms for drawing graphs in an aesthetically pleasing way. One of the goals for the force-directed algorithm is to lay out the graph in a manner that is comprehensible to the user so that the user can identify components as well as at least some information regarding relationships in the data. In a force-directed layout, the graph generally positions nodes in two-dimensional or three-dimensional space so that all or most of the edges are of equal length and there are as few crossing edges as possible. Forces may be assigned among the sets of edges and the set of nodes. In one example, the forces assigned to the edges act as springs. In other examples, the nodes may act as electrically charged particles.

Unfortunately, as the amount and the number of dimensions of the data grow, the layout of the graph becomes increasingly complex, slow, and computationally expensive. A bad layout may take a long time to draw and may hide or obscure information or relationships thereby rendering the graph ineffective.

Further, existing systems do not scale. The number of computations in existing systems increases dramatically as the number of nodes increases. For example, the number of computations may be N*N for every N number of nodes. As a result, as the amount of data that must be graphed increases, the graphical layout process may slow to the point that the process is no longer useable. Further, existing systems tend to render obscure, non-optimal layouts as the amount of data and/or dimensions increase.

SUMMARY OF THE INVENTION

Exemplary systems and methods for graphical layout are discussed. An exemplary method comprises receiving graphical data associated with points and edges, selecting a first predetermined number of points of the received graphical data, determining an initial distance between each of the first predetermined number of points, generating a fast approximate distance oracle comprising identifiers for at least a plurality of points of the received graphical data and oracle distances between at least one point associated with an identifier and at least one other point, the oracle distances including the initial distance between any of the first predetermined number of points, selecting a second predetermined number of points of the graphical data, determining a graphical distance for each of the second predetermined number of points relative to other points of the first and second predetermined number of points utilizing, at least in part, the fast approximate distance oracle, calculating a potential error between the determined graphical distance and a topologic distance between each of the second predetermined number of points and the first predetermined number of points and calculating a potential error between the determined graphical distance and a topologic distance between each of the second predetermined number of points and the other second predetermined number of points, approximating a correction for at least one of the second predetermined number of points based on at least one of the calculated potential errors, adjusting a position of the at least one of the second predetermined number of points based on the calculated graphical distance and the correction, and displaying the at least one of the second predetermined number of points.

In some embodiments, generating the fast approximate distance oracle occurs simultaneously or near-simultaneously with determining the initial distance for each of the first predetermined number of points relative to other points of the first predetermined number of points. Alternately, generating the fast approximate distance oracle may occur prior to determining the initial distance for each of the first predetermined number of points relative to other points of the first predetermined number of points.

Selecting the first predetermined number of points may comprise selecting each point of the first predetermined number of points based, at least in part, on the initial distance between points identified in the graphic data. Alternately, selection the first predetermined number of points may comprise selecting each point of the first predetermined number of points randomly from the received graphic data.

In various embodiments, calculating the potential error between the graphical distance and a topologic distance comprises determining the KK potential between at least one of the second predetermined number of points and the first predetermined number of points. Approximating the error correction for at least one of the second predetermined number of points may comprise calculating a gradient descent to minimize the KK potential.

The method may further comprise identifying a first subset of antigravity points associated with the at least one point of the second predetermined number of points, identifying edges associated with the at least one point of the second predetermined number of points, calculating forces associated with the first subset of antigravity points and forces associated with the edges that act upon the at least one point of the second predetermined number of points, and adjusting the position of the at least one point of the second predetermined number of points based on the force calculation. Further, the method may comprise identifying a second subset of antigravity points associated with at least one other point of the second predetermined number of points, identifying edges associated with the at least one other point of the second predetermined number of points, calculating forces associated with the second subset of antigravity points and forces associated with the edges that act upon the at least one other point of the second predetermined number of points, and adjusting the position of the at least one other point of the second predetermined number of points based on the force calculation.

The first subset of antigravity points comprises at least one point that is not a member of the second subset of antigravity points. In some embodiments, none of the points of the first subset of antigravity points are coupled to the at least one point of the second predetermined number of points by an edge.

An exemplary system may comprise data acquisition module, a point selection module, a hierarchical model module, a distance correction module, and a layout module. The data acquisition module may be configured to receive graphical data associated with points and edges. The point selection module may be configured to select a first predetermined number of points of the received graphical data and to select a second predetermined number of points of the graphical data. The hierarchical model module may be configured to determine an initial distance between each of the first predetermined number of points and to generate a fast approximate distance oracle comprising identifiers for at least a plurality of points of the received graphical data and oracle distances between at least one point associated with an identifier and at least one other point, the oracle distances including the initial distance between any of the first predetermined number of points. The distance correction module may be configured to determine a graphical distance for each of the second predetermined number of points relative to other points of the first and second predetermined number of points utilizing, at least in part, the fast approximate distance oracle, to calculate a potential error between the determined graphical distance and a topologic distance between each of the second predetermined number of points and the first predetermined number of points and calculating a potential error between the determined graphical distance and a topologic distance between each of the second predetermined number of points and the other second predetermined number of points, to approximate a correction for at least one of the second predetermined number of points based on at least one of the calculated potential errors, and to adjust a position of the at least one of the second predetermined number of points based on the calculated graphical distance and the correction. The layout module may be configured to display the at least one of the second predetermined number of points.

An exemplary computer readable medium may comprise instructions. The instructions may be executable by a processor for performing a method, the method comprising receiving graphical data associated with points and edges, selecting a first predetermined number of points of the received graphical data, determining an initial distance between each of the first predetermined number of points, generating a fast approximate distance oracle comprising identifiers for at least a plurality of points of the received graphical data and oracle distances between at least one point associated with an identifier and at least one other point, the oracle distances including the initial distance between any of the first predetermined number of points, selecting a second predetermined number of points of the graphical data, determining a graphical distance for each of the second predetermined number of points relative to other points of the first and second predetermined number of points utilizing, at least in part, the fast approximate distance oracle, calculating a potential error between the determined graphical distance and a topologic distance between each of the second predetermined number of points and the first predetermined number of points and calculating a potential error between the determined graphical distance and a topologic distance between each of the second predetermined number of points and the other second predetermined number of points, approximating a correction for at least one of the second predetermined number of points based on at least one of the calculated potential errors, adjusting a position of the at least one of the second predetermined number of points based on the calculated graphical distance and the correction, and displaying the at least one of the second predetermined number of points.

BRIEF DESCRIPTION OF THE DRAWINGS

FIG. 1 is a table of data for a force-directed graph in some embodiments.

DETAILED DESCRIPTION OF THE INVENTION

Figure 2A:
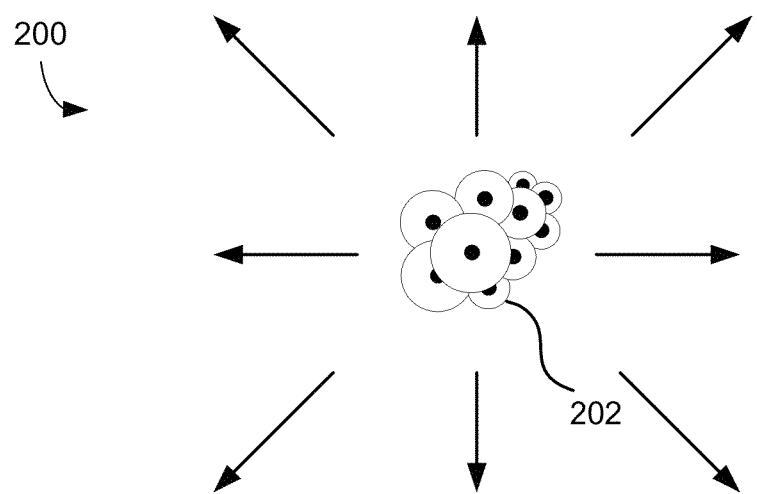
FIG. 2a depicts an initial graph layout of a force-directed graph of a circle in the prior art.

An effective graph layout may improve the understandability of the information represented by the graph and may be computationally efficient. An exemplary layout of a graph may include two stages including the initial layout and the layout over time. The initial layout may include the determination of initial positions of one or more nodes and edges. The initial layout may be computationally derived and/or displayed. Over time, the positions of the nodes and edges may change (e.g., expand) in a manner similar to a force-directed layout.

In some embodiments, the initial layout may approximate the final layout (e.g., the graphical layout over time). Although the process of the initial layout may be more computationally expensive due to the approximation, the speed in which a stable or semi-stable layout is achieved may be reasonably fast. Further, by approximating the layout over time, the initial layout may not include positions of balls and edges that may easily lead to tangles or saddle points. As a result, the layout over time may be more easily understood and useable by a user.

FIG. 1 is a table 100 of data for a force-directed graph in some embodiments. The table may be used to create a graph such as, but not limited to, a force-directed layout. The table 100 may contain data that identifies nodes and edges. In one example, the table 100 comprises vertices and adjacent vertices. The vertices may be a point at which a node is located. The adjacent vertices may indicate other nodes coupled with the first vertices. For example, in table 100, the node of vertices 1 may be coupled to nodes at vertices 2 and 10 (e.g., node 1 may be coupled to node 2 and 10 by separate edges).

A node may be a graphical representation of data. In some embodiments, the node may be represented as a ball, point, or any other shape on a graph. The edge may be graphically represented as a line or any other shape that may connect two nodes. In one example, a graph that depicts two nodes coupled by an edge may suggest a relationship between the nodes.

A node may represent a subset of data points that share a characteristic or property. The size of the node may represent the number of data points (e.g., a large node may indicate that the node represents many different data points). Color of the node may also represent a shared property or characteristic of the data associated with the node. An edge between nodes may indicate that the nodes share data points.

For example, one of many nodes may be associated with information associated with cancer survivors. A first node may indicate a gene expression for a group of cancer survivors while a second node may indicate a different gene expression for the same group. If the two nodes are connected by an edge, some of the cancer patients may demonstrate both gene expressions (e.g., each node includes the same patient that has both characteristics). The size or color of the node and/or edge may represent the number of shared data characteristics (e.g., the size of the edge suggests the number of shared patients between the two nodes).

Although a table is depicted within FIG. 1, those skilled in the art will appreciate that any data structure (e.g., table, queue, or database) or combination of data structures may be used. Further, although only two columns are depicted in FIG. 1, there may be any number of columns or dimensions of data that may be graphed.

Figure 2B:
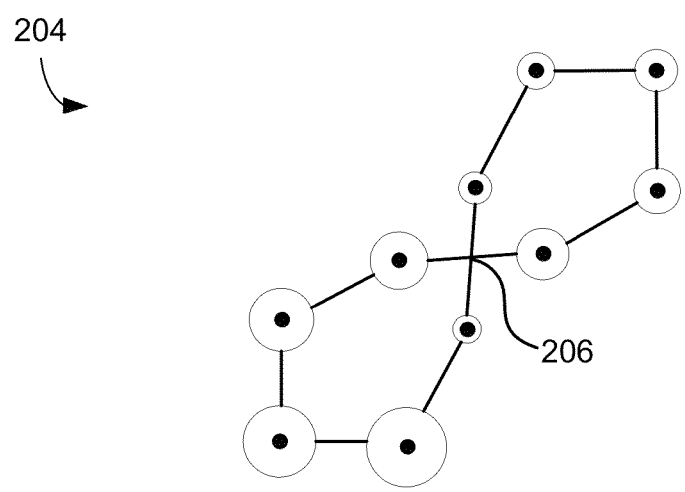
FIG. 2b depicts a final graph layout of the force-directed graph of the circle in the prior art.

FIGS. 2a and 2b depict an initial graph and a final graph of data that ideally should be represented as a circle. Although this case may be considered somewhat trivial, the problems associated with time, tangles, and instability increase as the number of nodes and edges increase.

FIG. 2a depicts an initial graph layout 200 of a force-directed graph of a circle in the prior art. Many existing layout methodologies initially graph all balls of a force-directed graph in a similar overlapping position 202. In a force-directed graph, edge forces (e.g., the lines connecting the balls) should push apart the balls after the initial position.

For example, each edge may be associated with a force similar to a spring which pushes connected balls apart when the balls are too close or pull the connected balls together when the balls are too far away. For example, the forces an edge works upon two adjoined balls may function as subject to Hooke's law of elasticity. As such, after the initial layout where balls with connecting edges overlap, the forces of the edges force the balls apart towards a broader graph (see FIG. 2b).

The process of adjusting the graph from the initial position 202 to a "final" position may be time consuming because each ball must travel to the final position. Further, the movement of each ball may influence the movements of other balls that are coupled via an edge.

By starting all of the nodes and edges in a single position, graphs may be displayed over time which are not optimal and may lead to instable configurations. For example, certain balls and edges may be twisted such that the forces of the edges are unable to "untangle" the graph. Moreover, starting the graph with all of the balls in a similar position may lead one or more balls or groups of balls continuously swinging between two or more semi-stable positions (e.g., if there are saddle points in the potential function for the graph layout for that data).

FIG. 2b depicts a final graph layout 204 of the force-directed graph of the circle in the prior art. The final graph layout 204 may begin as the initial graph layout 200 of FIG. 2a. In this example, the final graph should represent a circle, however, since the balls began in a single position (as depicted in FIG. 2a), the circle is twisted at point 206.

As discussed herein, the graph represented in FIGS. 2a and 2b are simple shapes. A more complex graph may include hundreds or thousands of such shapes. Simple tangles and saddle points that appear in "toy" examples may lead to complex tangles that obscure data and relationships.

Figure 3A:
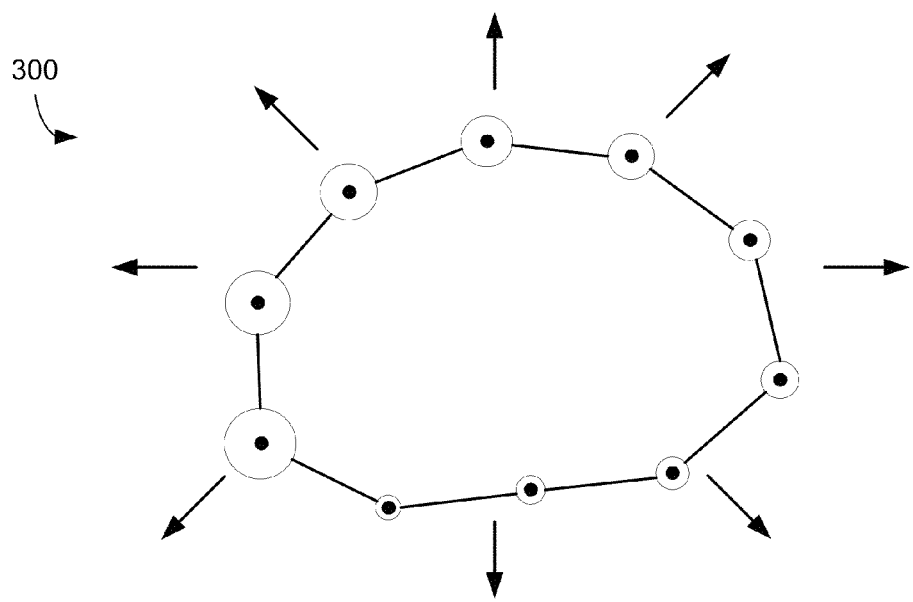
FIG. 3a depicts an initial layout of a graph of a circle in some embodiments.
Figure 3B:
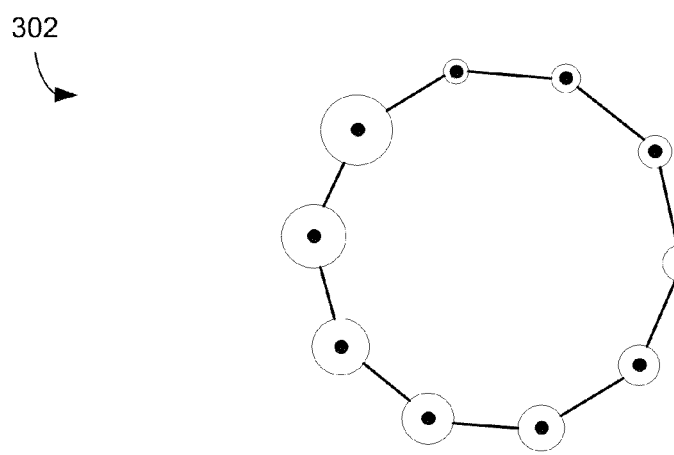
FIG. 3b depicts a layout of the graph of a circle over time in some embodiments.

Like FIGS. 2a and 2b, FIGS. 3a and 3b depict an initial graph and a final graph for data that ideally may be represented as a circle. Unlike FIGS. 2a and 2b, however, FIG. 3a depicts an initial graph that is created by approximating, in some embodiments, the solution as depicted in FIG. 3b. Since the solution is approximated, the balls of the initial layout may approximate the balls of a layout over time. Because the balls are close to their final position, less time may be required to adjust the position of the balls to reach the final layout when compared to the initial layout 202 of FIG. 2a of the prior art. Further, there may fewer tangles and instable results since the balls and/or edges are less apt to overlap in the initial graph.

FIG. 3a depicts an initial layout 300 of a graph of a circle in some embodiments. The final layout (e.g., layout over time) of the graph may be approximated in order to increase the speed of obtaining the final layout, reduce potential tangles, are reduce the possibility of an instable position. For example, rather than an initial layout wherein all balls are placed in a similar position (see FIG. 2a), the initial graph layout 300 may begin with balls in a generally circular shape which approximates the final shape as depicted in FIG. 3b.

In various embodiments, the initial layout may be computationally efficient. Further, in some embodiments, the time required to complete or approximate the final graph may be less when compared to starting all of the balls at a single position. The edges in the initial graph layout may push the balls farther apart thereby attaining the position of FIG. 3b.

FIG. 3b depicts a layout 302 of the graph of a circle over time in some embodiments. For example, once the initial graph layout 300 is rendered, the edges may push the balls to the final graph (i.e., a circle). Those skilled in the art will appreciate that the "final" graph is a graph or layout of nodes over time. The nodes and/or edges may continue to move relative to each other once the shape in FIG. 3b is obtained. Movements, however, may be minor or not noticeable. In some embodiments, the "final" graph comprises the layout of the graph over a predetermined period of time.

The time to push the initial graph layout 300 to the graph layout 302 may be shorter than the time to push all of the balls from a similar, overlapping position to a final position. Those skilled in the art will appreciate that even though the computation of the initial graph layout 300 may be greater than starting all balls on the same position, by approximating the layout of the graph over time, the time required to reach the graph layout 302 may be comparatively shorter. As a result, the time to adjust the graph to improve usability, access, and intractability may be reasonable while the time required to adjust an initial overlapping position may be too long (e.g., hours or more).

Those skilled in the art will appreciate that a user may understand information regarding the graph and the underlying data even if the layout over time has not yet been reached. For example, a user may view the initial layout and understand that, over time, the layout is likely to obtain a circular shape. With the information, the user may choose to interact with the graph (change the shape of the graph), retrieve information associated with one or more nodes, and/or analyze the underlying data.

In some embodiments, tangles and instability are avoided by approximating the final graph. For example, the twist at point 206 identified in FIG. 2b is unlikely since the balls and edges in the initial graph layout 300 are expanded and, as such, do not cross. Although the examples depicted in FIGS. 3a and 3b are simple, those skilled in the art will appreciate that approximating the final layout reduces overlap of balls as well as edge crossovers which reduce tangles and instability in larger, more complex structures.

Figure 4A:
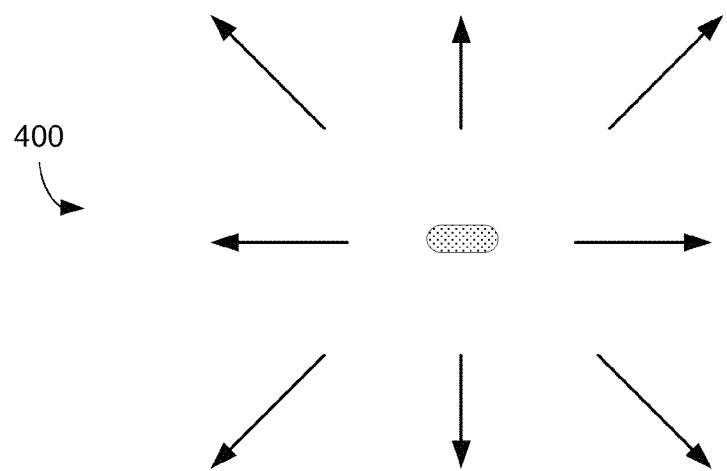
FIG. 4a depicts an initial layout of a force-directed graph representing a "blanket" of data in the prior art.
Figure 4B:
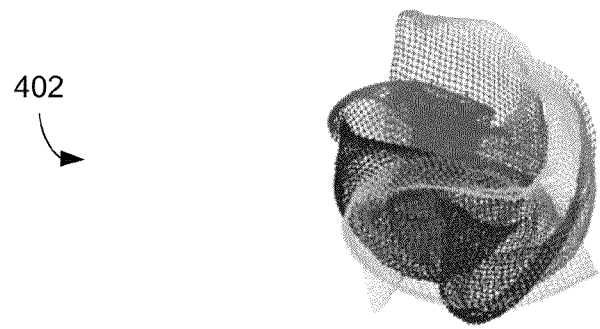
FIG. 4b depicts a layout of the force-directed graph of data over time in the prior art.
Figure 5A:
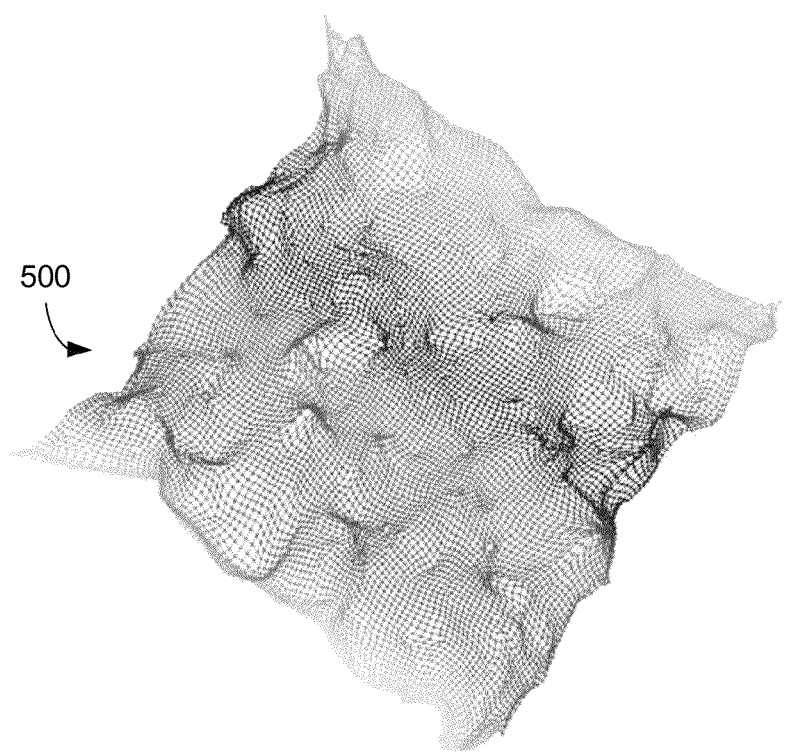
FIG. 5a depicts an initial layout of a graph representing a "blanket" of data in some embodiments.
Figure 5B:
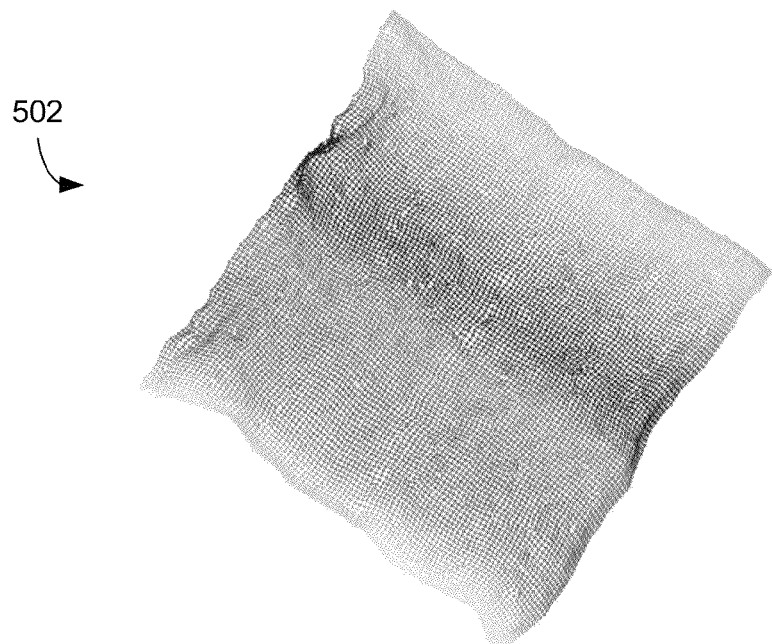
FIG. 5b depicts a layout of the graph representing the "blanket" of data over time in some embodiments.

FIGS. 4a and 4b of the prior art demonstrate how large amounts of associated data may not be reliably depicted. Since the initial layout of all points may begin at a similar position, a large number of balls and edges may ultimately become tangled and/or settle in positions that are not optimal. FIGS. 5a and 5b, in contrast with FIGS. 4a and 4b, show the initial layout and layout over time in some embodiments, where a improved representation is obtained.

FIG. 4a depicts an initial graph layout 400 of a force-directed graph representing a "blanket" of data in the prior art. The blanket of data is represented as a large number of balls that are coupled together and may represent a rectangular shape. All of the balls of the blanket data may begin at roughly one position in the prior art. The position will then expand as the forces of the edges push the balls apart. Due to the amount of data and complexity of the edge connections, the process of expansion may be time consuming and lead to tangles which, in turn, may need time to resolve.

FIG. 4b depicts a graph layout 402 of the force-directed graph of data over time in the prior art. The blanket of data in graph layout 402 is depicted as twisted and tangled. The length of time required by prior art systems to depict a stable graph in which the depiction may be usable increases with the amount and/or complexity of the data.

For example, the position of all balls in the prior art is constantly recalculated based on the forces provided by the edges. As the positions change, the forces change and, therefore, require constant updating. As a result, the process of the prior art is computationally inefficient and time consuming.

Further, since all the balls are being recalculated and moved simultaneously, balls are constantly moving into positions that are ultimately unstable or non-optimal. As a result, the balls either must waste computational cycles moving to positions that must be corrected (e.g., potentially moving the ball back to its initial position as the rest of the balls continue to move) or the balls end up in semi-stable tangles (e.g., saddle points).

In order to keep one or more balls from swinging between two or more semi-stable positions, many algorithms in the prior art limit a number of iterations of movement between the two semi-stable positions. As a result, instead of trying to solve the problem and change the graph into a more optimal layout, the prior art often depicts the graph with tangles and/or semi-stable positions as being "good enough."

FIG. 5a depicts an initial layout 500 of a graph representing a "blanket" of data in some embodiments. In various embodiments, a graph layout engine may receive the graphic data and approximate an intermediate or final solution for initial layout 500. The initial layout 500 depicts a "wrinkled blanket" which may be expanded as the forces of the edges force related balls to expand. Since the initial layout 500 approximates the intermediate or final layout, the process of expansion may be quicker when compared to the prior art. Further, since not all balls are beginning at the same position, there are fewer, if any, balls to untangle. Moreover, there are fewer semi-stable tangles since a majority of the balls of the initial layout may be in a general intermediate or final position.

As a result, the process of completing the graph and applying forces from the edges on the balls is computationally efficient, may be faster than the prior art, and may lead to improved results.

FIG. 5b depicts a layout 502 of the graph representing the "blanket" of data over time in some embodiments. The layout 502 is not necessarily a "final" graph because the balls may continue to move and make corrections. Over time, however, the "blanket" may begin as depicted in the initial layout 500 and may then expand and/or organize to the "blanket of data" depicted in layout 502.

Those skilled in the art will appreciate that FIGS. 3a, 3b, 5a, and 5b, may be simple examples. As the complexity of the data increases, a graph to be depicted may include many circles as depicted in FIGS. 3a and 3b and/or many blankets as depicted in FIGS. 5a and 5b. Further, the layout over time may not be symmetric but may be dependant upon the data to be graphed.

Exemplary engines and methods of initial layout and adjustment of the initial layout over time are further discussed in FIGS. 6-9 in more detail.

Figure 6:
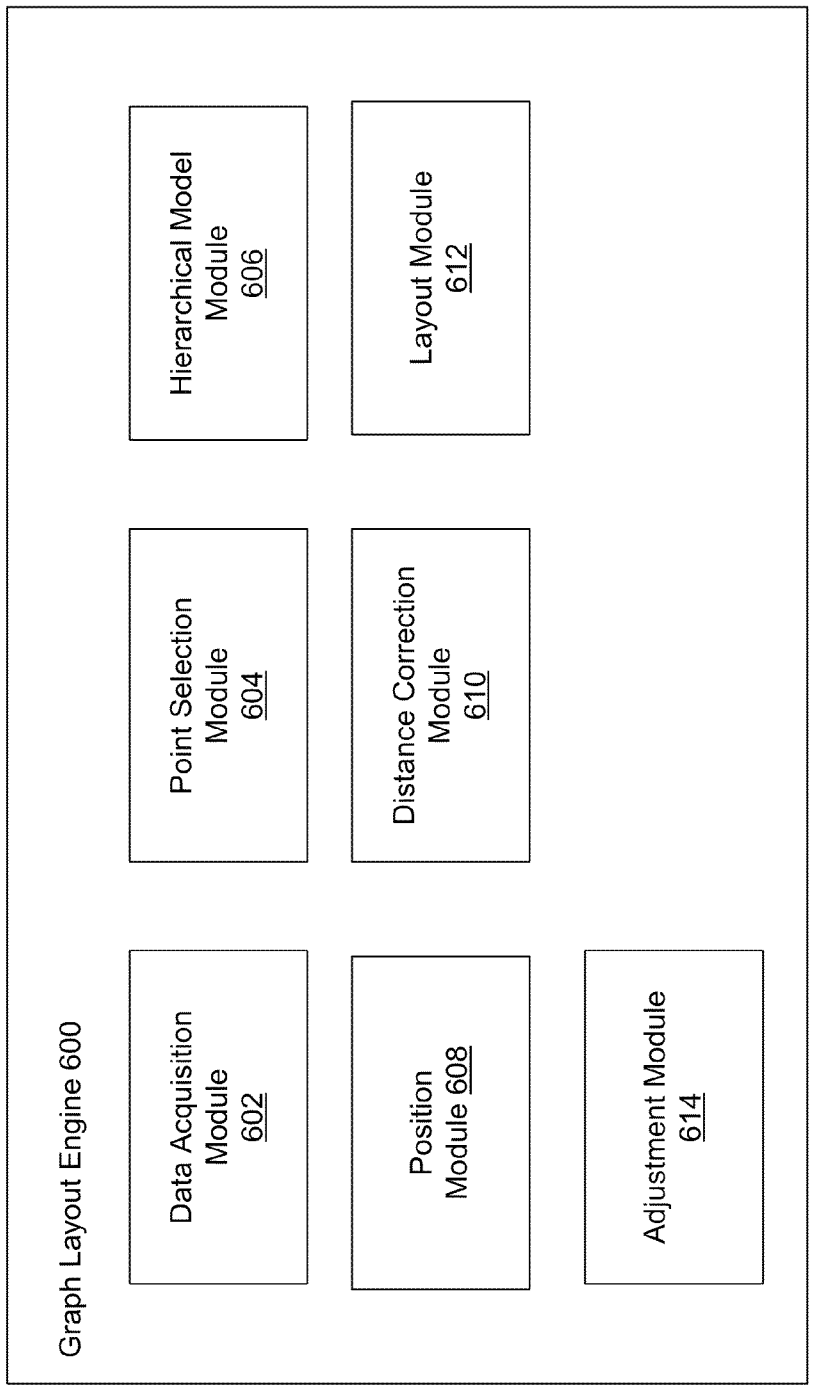
FIG. 6 is a block diagram of a graph layout engine in some embodiments.

FIG. 6 is a block diagram of a graph layout engine 600 in some embodiments. In some embodiments, the graphical layout or display may be performed in two stages. The first stage may comprise the determination and/or display of the initial layout. The second stage may comprise adjusting the initial layout with the goal of reaching a comprehensible and/or stable graph.

In a general example of the first stage of determining the initial layout, data for a graph may be received. Subsequently, a small subset (called the core) of points (e.g., nodes or balls) of the graph may be chosen. The subset may include points that will be displayed at different positions in the initial layout. Once the core points are positioned, subsequent subsets of points from the data are selected and may be positioned based on the core points and/or other points which are members of the selected core points.

Caused in part by the limited number of displayable dimensions, the position and/or distance of one or more points in the graph may not equate with the distances as mathematically derived from the received data. In order to improve the graphical layout, a potential may be determined for one or more points based on the mathematically derived distance and the distance as graphed. The potential may then be minimized to adjust the position of the points.

In one example, a KK potential and gradient-descent (starting with an initial set of positions) may be utilized to lay out the points in the core. Points may be added based on those points already present (e.g., those points that have already been positioned or approximately positioned) and an approximation of the KK solution may be calculated. Once all the points from the data are added, the graph may be updated (e.g., distances and/or position corrected) utilizing gradient-descent on the KK potential.

In some embodiments, the graph layout engine 600 comprises a data acquisition module 602, a point selection module 604, a hierarchical model module 606, a position module 608, a distance correction module 610, a layout module 612, and an adjustment module 614. The graph layout engine 600 may be any software, hardware, or a combination of both. The graph layout engine 600 may be configured to layout and/or draw a graph such as, for example, a force-directed layout graph. The graph layout engine 600 may be resident in a server, a user computer, or any other digital device.

The data acquisition module 602 receives data that may be used to build the graph. The data may be within a table or any other data structure. The data may be in a combination of different data structures. In one example, the data within a table identifies points and edges. The position of the points and/or edges may be identified by vertice as well as by adjacent vertice(s).

Those skilled in the art will appreciate that the vertices and adjacent vertices may represent any kind of data. For example, a massive data set with many dimensions (e.g., thousands of dimensions) may be represented by one or more data structures identifying vertices as well as adjacent vertices.

The point selection module 604 selects points (e.g., balls or nodes) to be positioned in the graph. Those skilled in the art will appreciate that the point selection module 604 may select any number of points based on any number of methods. In various embodiments, the point selection module 604 selects an initial subset of the available points (e.g., the core) from the received data. The selected points may be chosen at random, chosen based on some random information, or be purposefully chosen. In one example, the point selection module 604 selects points that are the farthest distance (e.g., measured by edges) from the previously selected points. For example, the first point may be randomly selected and the second selected point may have the longest distance (e.g., as measured by the maximum number of edges) from the first point when compared to any other two points from the received data. The next selected point may have the longest distance from both the first two selected points when compared to any other point in the received data. Further, the next selected point may have the longest distance from the first three selected points when compared to any other point in the received data. This process may continue until all of the points for the first subset are selected.

There may be any number of initially selected points that make up the first subset from the received data. In one example, 25 points may be initially selected. The 25 selected points may make up the first selected subset. In another example, any number of points equal to or less than 100 points may be selected for the first subset. Each subsequent subset may, in some embodiments, include a greater number of points that the previously selected subset.

In various embodiments, a filtration of depth K (on a set of V points in a graph where |V| is N) is a tower of subsets, V0 being the entire set, V0>V1> ... >VK, |Vi|/|Vi+1| is about 2, and |VK| is some minimal size.

In some embodiments, the point selection module 604 or position module 608 positions the core points more precisely than points that may be added at a latter time. Subsequent sets of points may then be selected and ultimately added to the graph. In various embodiments, for every subsequently selected subset of points, the point selection module 604 may select twice as many points as the previously selected subset of points. For example, one subset of points may include 110 points and, subsequently, the point selection module 604 may select 220 points in the next subset of points. The graph layout engine 600 may determine a position and/or adjust the position of each point in a subset before the point selection module 604 selects the next subset of points.

The hierarchical model module 606 and position module 608 construct a Faster Approximate Distance Oracle (FADO), an ordering of the points that places the FADO core points first, and a pair of arrays, nearest—an int[N][3] that maps each point k to the three points that appear before it in the filtration which are closest to it, and distance, a double[N][3] that maps each point k to the graph distances of those three nearest neighbors. Those skilled in the art will appreciate that each point k may be mapped to any number of points and may not be limited to being mapped to those points that appear before k in the filtration. Further, each point k may be not limited to being mapped to points that are closest.

The hierarchical model module 606 may construct a table or other structure that comprises distances (exact and/or approximations) between points. The construct or table may be a Faster Approximate Distance Oracle. The FADO may provide a mechanism for getting estimates of the position and/or distance between two or more points in a graph. In one example, the FADO comprises a table or other data structure that, for example, identifies every point. The position or distance of each point relative to one or more of the core points and/or previously positioned points may be determined. The FADO may comprise approximations of the position or distance of some points.

In some embodiments, the core of the FADO may be extracted for every non-trivial component of the graph. The core of the FADO and the component entries may be used to construct a permutation of the points of that component that places the core first. Then, the hierarchical model module 606 or the position module 608 may fill in "nearest previous neighbors" and their graph distances utilizing, for example, a repeated Dijkstra floodout. In some embodiments, this step may actually complete the building of the filtration instance. The reason that the ordering and the FADO may be built together (e.g., simultaneously or near-simultaneously) is that the core of the FADO may correspond to the initial set in the filtration. In some embodiments, the FADO stores only exact distance for log n points.

In various embodiments, the hierarchical model module 606 and/or the position module 608 may determine or correct a position and/or distances for a point and then perform a Dijkstra floodout to determine a predetermined number (e.g., 3) of previously placed points closest to the point to be placed. The hierarchical model module 606 and/or the position module 608 may determine the position of the point to be placed based on the predetermined number closest previously placed points. Those skilled in the art will appreciate that the points may be positioned relative to any number of points including the all or some of the core points, previously positioned points, or points to be positioned. In some embodiments, the graph layout engine 600 stores the determined position or distance in the FADO.

The FADO may initially be described for a finite metric space. A complete distance matrix may be extended to a non-negative weighted graph given by points and edges. For example, let V be the metric space, choose a subset A. For each point x in A, the hierarchical module 604 may compute distances between x and all other points. The approximate distance e(x,y) may be defined to be min a in A of d(x,a)+d(a,y). This may be an upper bound. Those skilled in the art will appreciate that if A is the whole space it is exact, but may not be usable. Further, if A is not too big, the calculation may be cheap. The storage overhead, for example, may be |V|*|A|. In some embodiments, an estimate of error is not determined, however, such estimates may be used. A subset may be chosen by taking max/min landmarks.

The hierarchical model module 606 and/or position module 608 may perform optional fixes to positions and distances in the FADO. For example, the hierarchical model module 606 may construct, for each point x, a ball B(x), of some specified BX_SIZE (say 25) around x containing the nearest BX_SIZE points to x. Then the hierarchical model module 606 may compute the distance between x and y by seeing if x is in B(y) or y is in B(x), and if not, taking the min a in A of d(x,a)+d(a,y). This process may repair errors that come from taking two points quite close to one another and estimating their distance as being quite large. For example, for sampled 5-100 dimensional Euclidean spaces, this may make the average of estimated distance/actual distance to be about 1.05-1.2.

In various embodiments, when there is no distance matrix, but the position module 608 may compute d(x,A) operations in sufficiently short amounts of time that the cost of the construction may still bounded by |V|*|A| for a graph of bounded degree. First, for each a in A the position module 608 may perform a Dijkstra traversal to compute the distances from a to every point in V. As in the case of the metric space, the point selection module 604 and/or the position module 608 may choose A by taking max/min landmarks.

Subsequently, the hierarchical model module 606, position module 608, and/or the distance correction module 610 may place core entries using full SSDE and then adjust using the KK potential force which can be computed on the core (e.g., because distances may be represented).

For each subsequent Vi after VK, i>0, the points may be placed using nearest/distance values and KKFInit. When all of the entries in a given Vi are placed, the hierarchical model module 606, position module 608, and/or the distance correction module 610 may iterate over each point n of the partial graph using the KK potential computed on a randomly selected set of points of kkf_counts[i] also in Vi. kkf_counts[i] decreases fast enough that the cost of all of these operations is O(N*ln(N)) (assuming that the number of edges is O(N)).

For V0 the initial placement may go as before, but, in some embodiments, the iteration step may compute the KK potential on just the adjacent points (e.g., the last step only does a local refinement). There may be any number of iterations. In one example, the number of iterations is ten.

In various embodiments, the distance correction module 610 adjusts the graphical distance of the points. In one example, the distance correction module 610 attempts to equate graphical distance (e.g., the distance as may be displayed in the graph) with topologic distance (e.g., the distances as determined mathematically based on the receive data). If these distances are equal, the distance correction module 610 may not perform any additional function. However, if these distances are not equal, the distance correction module 610 may attempt to display the graph distance at a point that approximates that topologic distance. In some embodiments, distances may equate with position.

In various embodiments, topologic distance is the distance within the mathematically defined space between two or more points. Those skilled in the art will appreciate that the topologic distance may have any number of dimensions. When the graph data received by the data acquisition module 602 is projected as a viewable graphic, the projection may limit the depiction of one or more dimensions used to display the points. As a result, the graphical distance (e.g., Euclidean distance) between two points as displayed in the graph may not equate the topologic distance between the two points as defined in the mathematical space.

In order to improve the layout of the graph, the graphical distance may be equated to the topologic distance and/or an approximation may be determined to allow the graphical distance to approximate the topologic distance. In various embodiments, the graphical distance between two or more points may be displayed in a manner that enables the user to perceive the graphical distance as approximating or representing the topologic distance.

In some embodiments, a potential may be calculated between two or more points. The potential may provide a gradient that may be decreased and/or minimized to improve a graphical distance approximation. In one example, the distance correction module 610 may determine the potential using the KK potential. The distance correction module 610 may subsequently apply a gradient descent upon the potential to determine the graphical approximation to the topologic distance.

In an example of utilizing the KK potential, a potential function a graph may compare the relative distances, denoted |X−Y|, of the point positions in Euclidean (e.g., displayed graph) space, where the position of point i is denoted by loc(i), to their interpoint distances in the intrinsic graph metric, Denoted DG(i,j). In some embodiments, if we define err(i,j) as err(i,j)=(|loc(i)−loc(j)|−DG(i,j)) we may then define the stress of the graph to be:

$$\text{stress}(G) = \text{SUM}(i<j \text{ in } G)\{(W(i,j)*\text{SQUARE}(\text{err}(i,j)))\}$$

for some positive, symmetric weight function W(i,j).

The weight function may be DG(i,j) to some negative power such as 1/(DG( )*DG( )). in that case:

$$\text{stress}(G) = \text{SUM}(i<j \text{ in } G)\{\text{SQUARE}((|loc(i)-loc(j)|/DG(i,j))-1.0)\}$$

We may define a real-valued function from R2, say, by defining the stress of the graph with point i at X to be $$\text{stress}(G,X) = \text{SUM}(j!=i) \text{ in } G)\{\text{SQUARE}((|X-loc(j)|/DG(i,j))-1.0)\}$$

In this case, the negative gradient may be:

$$-2.0*\text{SUM}(j!=i)\{((|X-loc(j)|/DG(i,j))-1)([X-loc(j)]/(DG(i,j)|X-loc(j)|))\}$$

or $$-2.0*\text{SUM}(j!=i)\{1/DG(i,j)*(1/DG(i,j)-1/|X-loc(j)|)*[X-loc(j)]\}$$

We may use this gradient, normalized, to graph and/or display a force-directed layout.

For example, for a KK solution for a 4 point (e.g., 4-point) problem, if there is a point that wasn't placed, the distance correction module 610 may attempt to place the point by finding the three closest points that were already in place (e.g. points whose positions have been determined), and then the distance correction module 610 may place the point at the spot that minimizes the KK potential for those 4 points.

In various embodiments, in order to determine the placement of a new point, three points are selected (e.g., wherein the three points have already been placed within the graph) and the new point may be placed in the spot that minimizes the potential for each pair of the three points. The minimum may be either 1 or 2 points. In some embodiments, the three points that are closest together may be selected and the barycenter (a+b+c/3) of those three points may be determined. The new point may be placed at or near the barycenter.

For example, for hierarchical layouts, the distance correction module 610 may take K points already placed, and then the distance correction module 610 may place X so as to minimize the potential for that point. The distance correction module 610 may take K to be all the points, but that may make the problem at least N-squared.

Those skilled in the art will appreciate that two points may be relatively simple to solve, however, if P1 is at (0,0) and P2 is at (1,0), then regardless of X=(x,y), the point (x,−y) also may have the same potential (for those 3 points). As a result, the distance correction module 610 may take three points. Further, those skilled in the art will appreciate that although the KK potential may be determined for three general points and a fourth may be added, the result may be close to the barycenter of the three closest 3-point solutions.

After the potential is determined, the distance correction module 610 may perform a "relaxation" step wherein the distance correction module 610 minimizes or approximates the minimum of the potential function for the graph as currently constructed (e.g., for those points which have been graphically displayed and/or positions have been determined). The "relaxation" step may be performed as one or more of the placements of points are determined. Those skilled in the art will appreciate that as this process is completed at the initial stages, the results will improve at the time the graph layout is completed since it is possible that not all the points in the end of the process may be accounted (e.g., to take into account all points at the end of the process may be computationally too expensive).

In various embodiments, the gradient of the potential for each point (pretending that all the other points are fixed) is approximated. In one example, a predetermined number of points may be chosen. The points may be chosen at random or order may be included in the process of choosing points. For example, several points that are a maximum number of edge lengths away from each other and/or the other selected points may be chosen. The gradient may then be computed. In some embodiments, for the last "relaxation" step, the points that are connected to X may be taken to make a gradient. Those skilled in the art will appreciate that there are many ways to approximate the gradient of the potential.

Many methods may be used to adjust the position or distance of the points. For example, the distance correction module 610 may perform a gradient descent with a max step-size and remembering the last step because the potential may have oscillations which may be damped. The gradient descent may also be computationally reasonably quick. Those skilled in the art will appreciate that that the points may be moved in any number of ways, including, but not limited to, the Runge-Kutta method for getting a higher-order approximate solution.

Once the initial position and/or distance for each point is determined, the layout module 612 may display the points within the graph. In some embodiments, the layout module 612 displays any number of points before the initial position and/or distance of all points are determined. In various embodiments, the layout module 612 may not display the graph until one or more points of the graph are adjusted by the adjustment module 614.

In various embodiments, once the position and/or distances are determined for each point, the position of one or more points is adjusted by the adjustment module 614. The adjustment module 614 may move or adjust points to ensure that all forces acting upon each point cancel and there is no net effect. If all forces upon a point cancel, then the points may no longer be moved.

In some embodiments, the adjustment module 614 determines forces upon a point. The forces may include the force provided by the edges coupled to the point as well as forces that are provided via a subset of points in the graph. The subset need not be coupled to the subject to produce a force. For example, for a subject point, the adjustment module 614 identifies a subset of points of the graph that may enact a force on the subject point and identifies the forces on the subject point provided by the edges.

The adjustment module 614 may provide the distance correction module 610 a new position for the subject point that may allow the forces on the subject point to cancel or otherwise trend towards a zero net effect. In some embodiments, the adjustment module 614 may adjust or direct the distance correction module 610 to adjust the position of a point until the forces that are enacted on that point become zero force or are within a predetermined threshold (e.g., within a proximity of zero force). The adjustment module 614 may spread one or more points apart by enforcing the spring or energy of connecting edges as well as the forces provided by the identified subset.

The adjustment module 614 may select a different subset of points for one or more different points. For example, each point may be influenced by a different subset of points. If a member of a subset provides a force on a subject node, the subject node may also provide a force on the member of the subset in return. As a result, all forces throughout the graph may cancel depending on the positions of the points.

In one example, the edges (e.g., springs) have a desired length, which may be constant (e.g., 1.0 for all edges in the graph). The edges may also repel (e.g., through a function similar to Hooke's law) when connected points are too close and attract when the connected points are too far apart. When a component has too many points (e.g., a component's points are greater than 100), instead of using N*N calculation, the adjustment module 614 may construct balanced samples of the component of a predetermined size (e.g., 20). When the adjustment module 614 uses samples, the adjustment module 614 may compute the gravitational force on a point x by computing the usual "gravitational" force exerted by each point in sample[x] on x, and then multiplying that force by (N−1)/(# in sample[x]). The size of sample[x] may be the same for all x, when the adjustment module 614 samples, but it is possible for sample[x] to have repeated values (but x may not be in sample[x]).

In various embodiments, the adjustment module 614 constructs a set of size 'balanced samples' of [0,modulus-1]. The return value, samples[ ][ ], may be an int[modulus][size], where samples[i] is a 'random' subset of [0,modulus-1]. The samples may be balanced in that if A appears in samples[B] n times, then B appears in samples[A] the same number of times, and X in [0,modulus-1] appears precisely size times in all of the samples.

In some embodiments, being balanced means that the net force on a component may be 0, and it spreads the pairs around the component. If the component is of size N, and the samples are of size K, then recall the adjustment module 614 may multiply the force by (N−1)/K to adjust for looking at fewer points (in other words, it really is the ratio of the number of points looked at vs. how many that would have been looked at in the non-sampling case).

Those skilled in the art will appreciate that one way to make these balanced samples is to take the "columns" to be given by permutations of the set that do not have fixed points (e.g., no point can push on itself), and make sure that the permutation and its inverse are both included (so we throw out an self-inverses). Permutations may be avoided that have short cycles (if there is a small subset that the permutation keeps fixed, then everything in that set may be ignoring the rest of the component).

In some embodiments, the particular permutations used by the adjustment module 614 may map the elements from [0, N) by x→(A*x+B)% N, where B is non-zero and A is relatively prime to N. They may be simple, and may seem to have relatively long periods. Those skilled in the art will appreciate that the adjustment module 614 may choose permutations at random, or construct them in other ways. In various embodiments, it is not necessary to use permutations.

It will be appreciated that a "module" may comprise software, hardware, firmware, and/or circuitry. In one example, one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

In some embodiments, the graph layout engine 600 stores only n log n positions and/or computations in storage as opposed to n*n positions or computations as required by the prior art. As a result, in some embodiments, techniques discussed herein may be more computationally efficient than those in the prior art.

Figure 7:
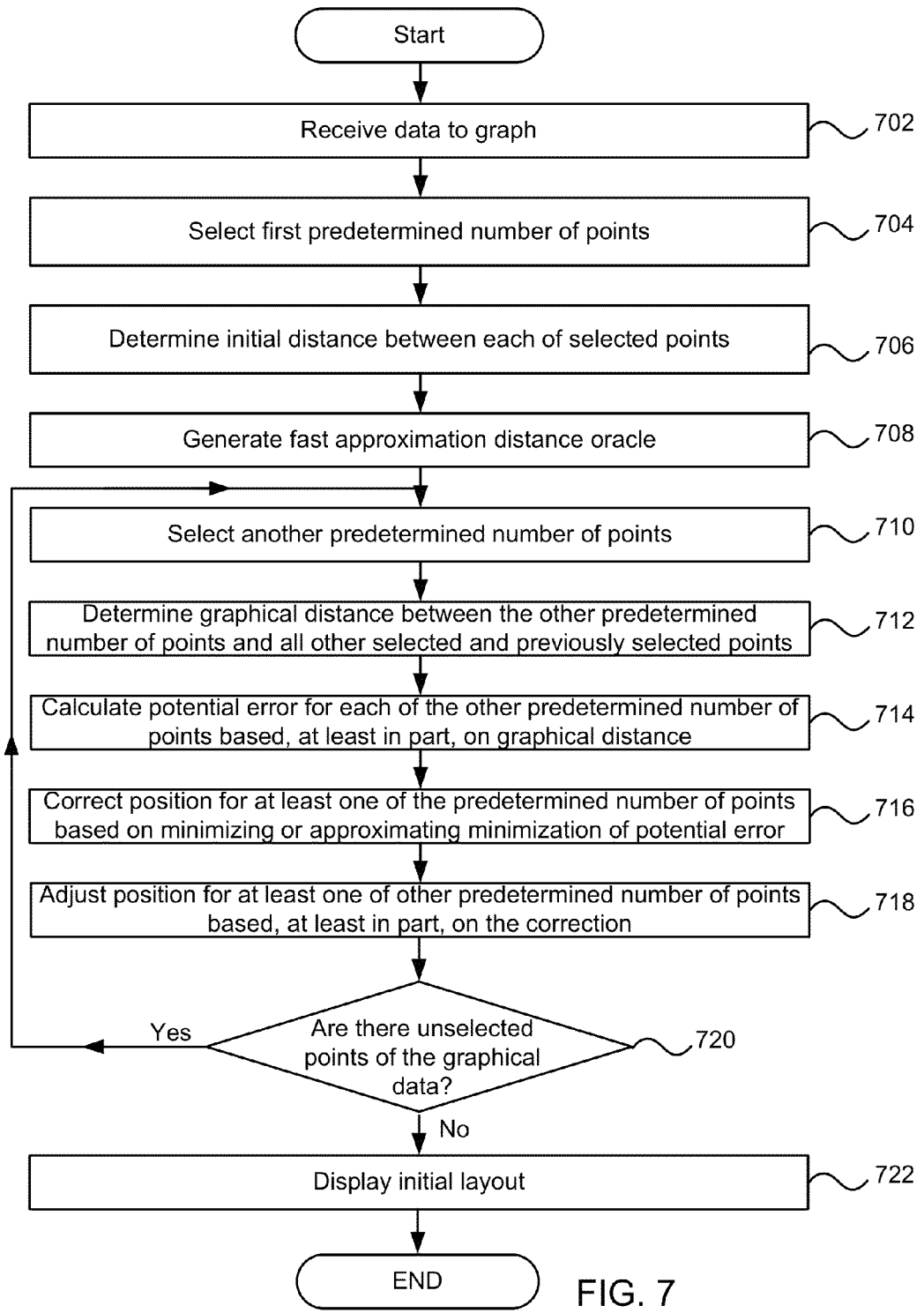
FIG. 7 is a flow chart of a method for an initial graph layout in some embodiments.

FIG. 7 is a flow chart of a method for an initial graph layout in some embodiments. In step 702, the data acquisition module 602 receives data to graph. In some embodiments, the data may be a table or other data structure comprising information associated with points and edges. In one example, the data structure comprises a list of vertices and adjacent vertices. In various embodiments, the data acquisition module 602 may be configured to convert data in any format or combination of formats into a table or other data structure of points and edges.

In step 704, the point selection module 604 may select a first predetermined number of points (called the core). In some embodiments, the core points may be spaced throughout the general graph. The points may be randomly selected. In some embodiments, subsequently selected points may also be random or selected based, in part, on distance from previously selected points. As a result, the placement of subsequent points may also be spaced across the graph. Those skilled in the art will appreciate that each subsequent set of points may be built around the core and the previously positioned points.

In step 706, the position module 608 may determine an initial distance between each of the first predetermined number of points. The position and/or distance of each of the first predetermined number of points may be determined based on the received data. In some embodiments, the selection of points for the first predetermined number of points may occur simultaneously or near simultaneously. For example, although the first point of the core may be chosen at random, a second point may be selected that is the farthest distance (e.g., as measured by number of edges) from the first selected point. As a result, the position of the second core point may be determined as a part of the process of point selection. The next selected point may be the farthest distance from the first and second selected points. The process may continue in a like fashion until the core points are selected. The next predetermined number of points may be positioned based, in part, on the position of the core points. The third predetermined number of points may each be positioned based, in part, on the positions of the core points as well as the positions of the second predetermined number of points. This process may continue until all of the points are selected. In some embodiments, all points are randomly selected.

In some embodiments, the core points may be selected and/or positioned using an eigenvector approach where the first two eigenvalues are correlated to the x and y axis, respectively. The eigenvector may position the core points in a computationally efficient manner. Once the core points are selected, subsequent points may be selected and/or positioned based on the FADO as described herein. Although eigenvector approaches can be efficient for limited uses, these approaches may not effectively scale and, further, eigenvector approaches may cause significant changes in a depicted graph if the graph is altered (e.g., changed by a user selecting and dragging one or more points for an improved layout).

In step 708, the hierarchical model module 606 may construct the fast approximate distance oracle (FADO). The FADO may be a reference table or other data structure that comprises point identifiers and at least some positions and/or distances between points. The positions of points and/or distances between points of the core of the FADO may be determined. Positions and/or distances determined and stored in the FADO may be approximations thereby potentially increasing computational efficiency.

Those skilled in the art will appreciate that the FADO may assist in the initial layout of the graph. The FADO may contain point identifiers as well as information associated with the points that allow for the determination or calculation of positions of one or more points and/or distances between one or more points.

In some embodiments, the FADO is optional. For example, distances and positions may be determined based on subsequently placed points as discussed herein without referring to a data structure that previously stored the information.

In step 710, the point selection module 604 may select another subset of points. Each subsequent subset of points may be larger than the previous subset. In some embodiments, every subset of points selected after the initial subset may contain points that were randomly selected. In some embodiments, the points may be selected in a manner similar to the selection of points of the first subset (e.g., based on position and/or distance from previously selected points).

In step 712, the distance correction module 610 determines graphical distance between the other predetermined number of points and all other selected and previously selected points. The position of the newly selected points may be based, at least in part, on information contained with the FADO. For example, the point selection module 604, hierarchical model module 606, and/or the position module 608 may retrieve or compute graphical distances between each of the points of the newly selected subset as well as graphical distances between each of the newly selected points and the previously selected points. One or more of the graphical distances may be approximated and/or based on previous approximations.

In step 714, distance correction module 610 may calculate a potential error for reach of the other predetermined number of points based, at least in part, on the graphical distance. In one example, the point selection module 604, hierarchical model module 606, and/or the position module 608 determines a topologic distance between two or more points. The topologic distance may, in some embodiments, be stored in the FADO. The distance correction module 610 may compare the graphical distance to the topologic distance to determine and/or calculate a potential error. If there is no error or the error is within a predetermined error margin, no potential error is calculated in the process may go to step 720. In some embodiments, the potential error may be represented as a potential (e.g., kk potential).

In step 716, if the graphical distance and the topologic distance between two or more points are not equal, the distance correction module 610 may determine a correct position for a point based on minimizing or approximating minimization of the potential error. In one example, the distance correction module 610 minimizes or approximates the minimization of the potential (e.g., kk potential).

In step 718, the position module 608 and/or the layout module 612 may adjust the position of at least one point based, at least in part, on the correction. In various embodiments, the adjustment to the position and/or distance is stored in the FADO. In some embodiments, the adjusted position of the point is displayed and/or stored in any data structure.

In step 720, the point selection module 604 determines if there are any unselected points from the graph data. If not, all points have been selected and their positions or distances determined, the method may continue in step 710 where the point selection module 604 may select another subset of points.

In step 722, the layout module 612 displays the initial layout. In various embodiments, the layout module 612 displays all points and edges simultaneously or near simultaneously. In one example, the layout module 612 depicts the initial layout when all positions with potential error have been adjusted. In some embodiments, the layout module 612 depicts each point of the graph if there is no potential error or upon correction of the potential error. Those skilled in the art will appreciate that, however, that any number of points may be displayed at any time. For example, the layout module 612 may display any number of points after positions and/or distances of a predetermined number of points has been determined and/or corrected. In some embodiments, the layout module 612 displays each point as soon as the initial position is determined. Subsequently, the layout module 612 may visually adjust the position of the point as necessary.

Figure 8:
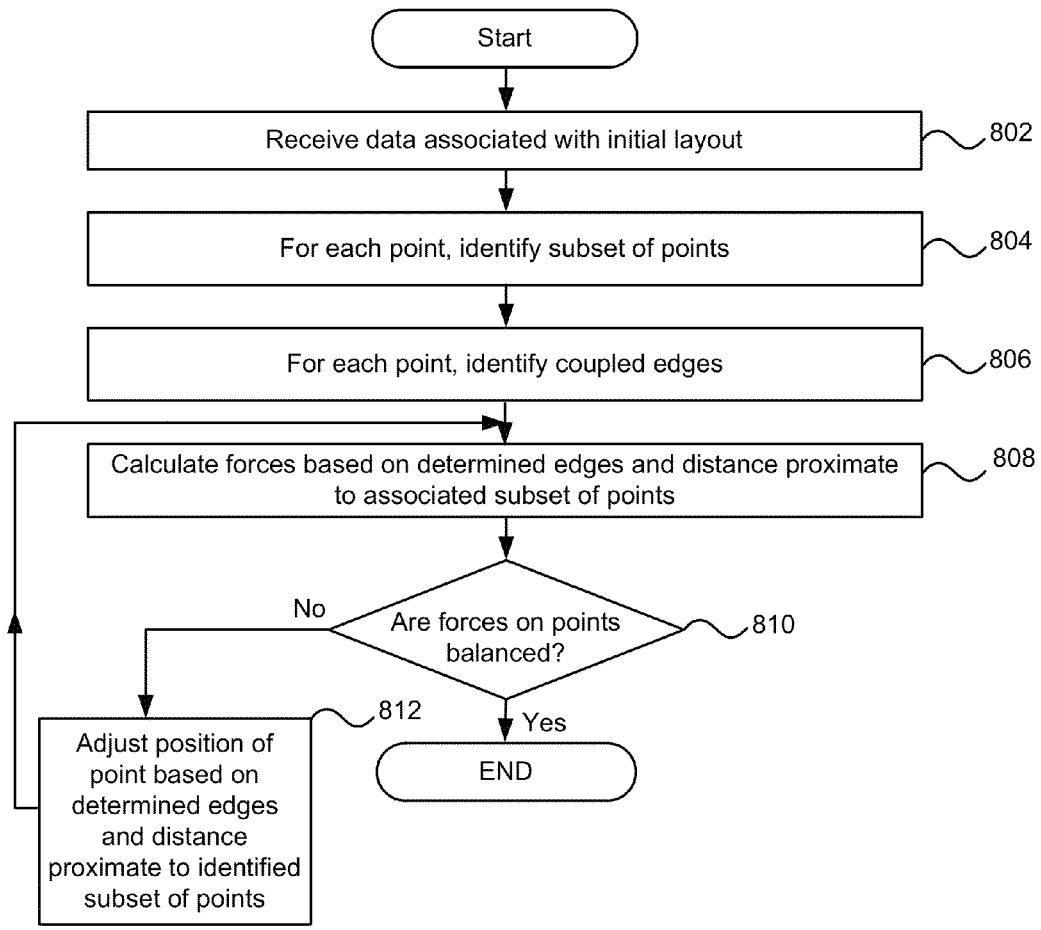
FIG. 8 is a flow chart of a method for adjusting the graph layout in some embodiments.

FIG. 8 is a flow chart of a method for adjusting the graph layout in some embodiments. In step 802, the graph layout engine 600 receives data associated with the initial layout. In some embodiments, this step is optional. For example, the graph layout engine 600 may have generated the initial layout, and, as a result, does not to retrieve or otherwise receive the data associated with the initial layout. In some embodiments, the graph layout engine 600 may generate and provide the initial layout to one or more digital devices, processors, storage devices, and/or buffers. Those skilled in the art will appreciate that the graph layout engine 600 may retrieve the initial graph layout from one or more sources. In some various, there are multiple graph layout engines including a first engine that prepares the initial graph layout while the second engine performs the adjustments.

In step 804, the point selection module 604 and/or the adjustment module 614 may identify a subset of points for each point of the initial layout. Each point of the initial layout may be associated with a different subset of points. The points of the subsets may be termed "antigravity" points. In some embodiments, one or more points may be positioned, at least in part, relative to one or more of the antigravity points as if there was an edge applying a force. For example, a point may be coupled to three other points by three edges. The graph may have four antigravity points. The point may be subject to the forces of the three edges as well as forces that would be derived if the point was coupled to the antigravity points by additional edges. The points of the subset(s) may be located at different positions throughout the graph (e.g., in a manner similar to the core points that are initially selected during the initial layout).

There may be any number of antigravity points associated with at least one other point. For example, there may be 100 antigravity points applying force to one other point. In some embodiments, a first point may act as an antigravity point to 100 points which, in turn, act to provide force as antigravity points to the first point.

In various embodiments, one or more points of the initial layout may be influenced by different subsets of antigravity points. The applied forces may be symmetrical. For example, if two points are coupled by an edge, both points will be affected by the force of the edge. Similarly if a first point acts as an antigravity point to a second point, the second point may act as an antigravity point to the first point.

In step 806, the adjustment module 614 identifies edges and forces, if any, for each point of the initial layout. In step 808, the adjustment module 614 calculates the forces on each point based on the identified edges and the associated subset of antigravity points. In various embodiments, the adjustment module 614 may enforce forces associated with actual edges and/or points that are proximate (e.g., without a predetermined distance threshold). For example, the adjustment module 614 may determine the forces acting upon a point as including actual edges of the point as well as the forces between proximate one or more antigravity points (e.g., one or a subset of all of the antigravity points).

In step 810, the adjustment module 614 may determine if all of the forces on all of the points are balanced. If they are not balanced, then, in step 812, the adjustment module 614 may adjust the position of one or more points based on predetermined edges and distance proximate to the identified subset of points (e.g., the core). In some embodiments, the layout module 612 depicts the adjustment during or after the position is adjusted. The process continues in step 808 where the adjustment module 614 may recalculate, based in part on the new positions of one or more points, the forces based on the determined edges and distance proximate to the associated subset of points. Alternately, if the forces on all points are balanced, the method may end.

Those skilled in the art will appreciate that, in some embodiments, all points are assessed and changes made to the position or distance of points simultaneously or near simultaneous. In some embodiments, one point or a subset of points are selected. For each selected point, the adjustment module 614 may identify points and edges, calculate the forces based on the edges as well as the assumed edges to the antigravity points, and make the changes. Subsequently, another subset of previously unselected points may be similarly assessed and adjusted, and so on.

Figure 9:
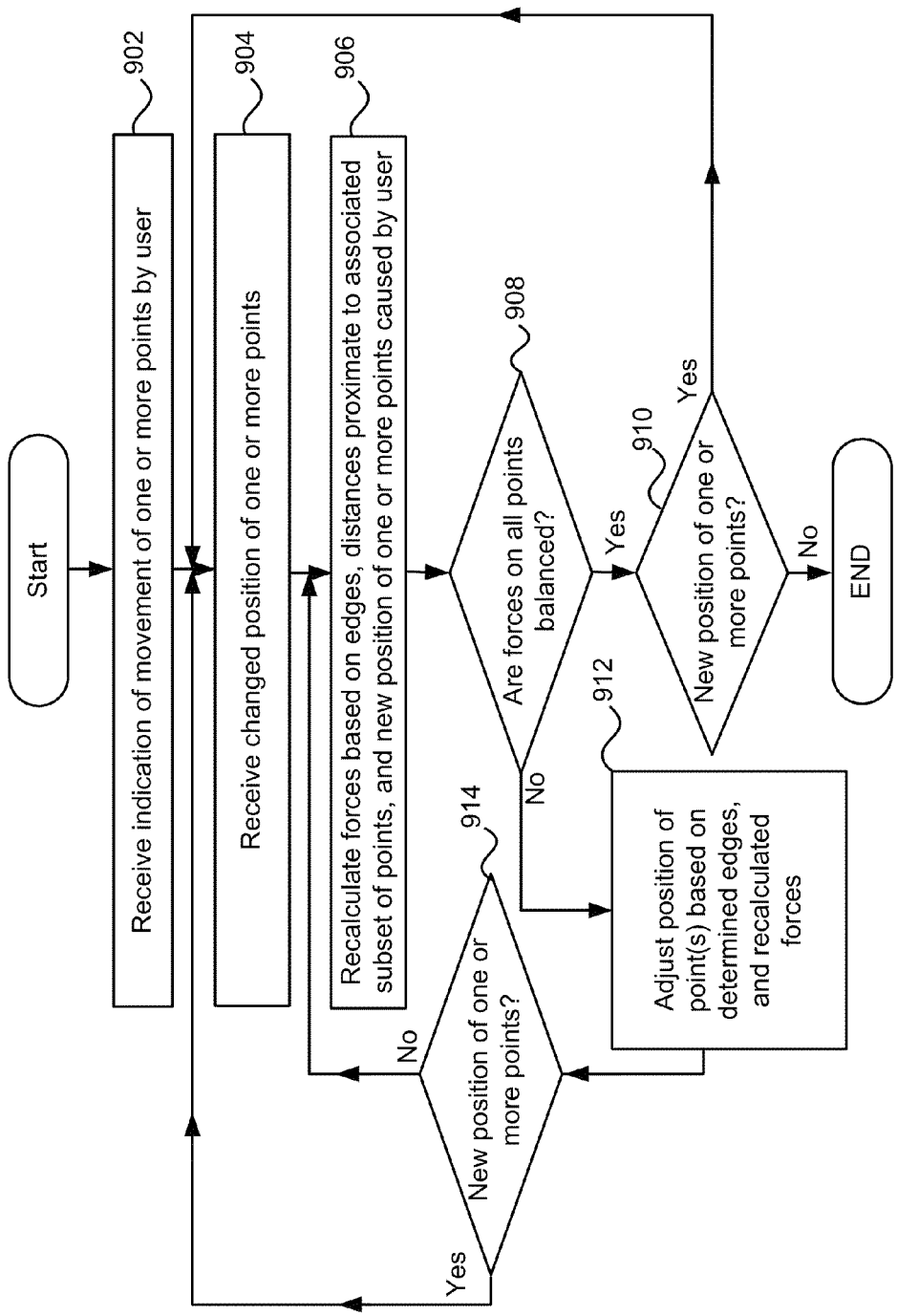
FIG. 9 is a flow chart of a method for adjusting a graph layout in response to a user moving one or more points in some embodiments.

FIG. 9 is a flow chart of a method for adjusting a graph layout in response to a user moving one or more points in some embodiments. In step 902, the graph layout engine 600 may receive an indication of movement of one or more points of a graph by a user. In some embodiments, the layout module 612 may react to a user clicking and dragging one or more points by allowing the selected point(s) and related points (e.g., those coupled to the moving points by an edge). In some embodiments, a digital device, as discussed herein, indicates movement of one or more components of the graph has taken or is taking place.

In some embodiments, the graph layout engine 600 may initially display movement of the user's selection (e.g., the selected points and edges as well as those edges and points coupled to the user's selection) without adjusting the position of the points and edges of the rest of the graph. In one example, the graph layout engine 600 is responsive to any selection or movement of the user. Once cycles and/or resources are available, the graph layout engine 600 may recalculate forces for one or more points that may be effected by the user's action. As a result, the forces of all points that may be associated with the user's action (e.g., a point or edge that is coupled, however indirectly, with the user's selection) may be recalculated to determine a new position. Points and edges that have no relation to the user's selection (e.g., a separate collection of points and edges that are not coupled in any way to the user's selection) may not be recalculated. Those skilled in the art will appreciate that, in some embodiments, the forces on one point, a subset of points, or all points may be recalculated and movements determined at any time.

In step 904, the point selection module 604 and/or the adjustment module 614 may receive or determine a change of position of one or more points. In one example, the adjustment module 614 may receive from an operating system or other application information related to what the user selected and any movement of the selected portion of the graph. This information may, in some embodiments, be received from a rendering engine configured to display the graph, receive user interactions, and respond to user interactions.

In step 906, the adjustment module 614 recalculates forces for one or more points based on edges, distances proximate to associated subset of points, and new position of one or more points caused by the user. As discussed herein, each point of the initial layout may be associated with a different subset of antigravity points. The antigravity points may continue to provide forces on the associated points. As a result, in order to determine the forces on a point, the point's edges are taken into account as well as the forces from the subset of antigravity points (e.g., in a manner similar to the process discussed regarding adjusting the initial layout over time).

In step 908, the adjustment module 614 may determine if all of the forces on all of the points are balanced. If the forces on all points are balanced, the graph layout module 600 determines if there are new positions of one or more points caused by the user in step 910. If they are not balanced, then, in step 912, the adjustment module 614 may adjust the position of one or more points based on the recalculated forces.

In various embodiments, the adjustment module 614 may adjust the position of any number of points and edges during the user's interaction. For example, as the user drags a selection of points and edges, the adjustment module 614 may recalculate forces and move a number of points and edges associated with the user's selection and action. As the user continues to act (e.g., by continuing to move the previously selected points and edges or the user moving another subset of points and edges), the adjustment module 614 may continue to recalculate forces and adjust positions. These processes may occur in parallel.

If, in step 910, the graph layout module 600 determines that there are new positions from the user, the process may return to step 904 and the new positions are received.

In step 914, the graph layout module 600 determines if there are new positions of one or more points caused by the user. If the graph layout module 600 determines that there are new positions from the user, the process may return to step 904 and the new positions are received. If there are no other new positions from the user at that time, the adjustment module 614 may recalculate forces based on edges, distances proximate to associated subset of points, and the new (e.g., last) position of one or more points caused by the user in step 906.

In some embodiments, the layout module 612 depicts the adjustment during or after the position is adjusted.

Those skilled in the art will appreciate that, in some embodiments, all points are assessed and changes made to the position or distance of points simultaneously or near simultaneous. In some embodiments, one point or a subset of points are selected. For each selected point, the adjustment module 614 may identify points and edges, calculate the forces based on the edges as well as the assumed edges to the antigravity points, and make the changes. Subsequently, another subset of previously unselected points may be similarly assessed and adjusted, and so on.

Figure 10A:
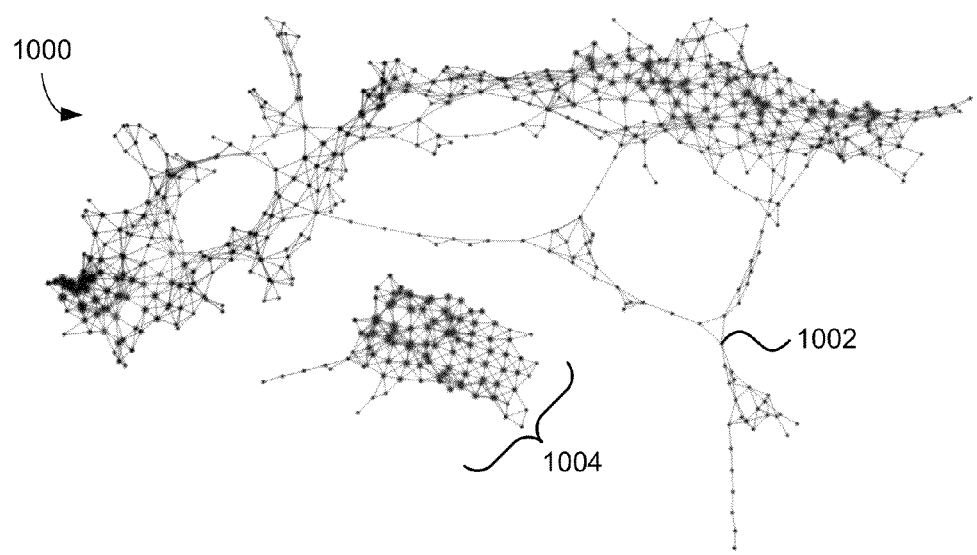
FIG. 10a is a graph layout in some embodiments.

FIG. 10*a* is a graph layout 1000 in some embodiments. Graph layout 1000 may depict a stable graph layout. For example, the graph layout 1000 may depict a graph after the initial layout and the adjustment of the initial layout.

Graph layout 1000 depicts a large number of points of complex data. In some embodiments, points that are connected (e.g., coupled together by an edge) share at least some data. For example, each point may represent a plurality or combination of independent variables (e.g., patient identifiers) that share one or more dependent variables (e.g., characteristics). For example, point 1002 may represent a number of patients that share a particular gene expression or test result. Alternately, one point may represent a plurality or combination of dependent variables that share one or more independent variables. The size of the point may indicate the number of independent variables (e.g., a larger point suggests that there are a large number of people who share that gene expression or test result while a smaller point suggests that there are a smaller number of people who share the gene expression or test result).

An edge between points may suggest that the connected points share independent or dependent variables. In one example, two connected points may share one or more of the same patients. A patient with both gene expression A and gene expression B may be identified in both points; as such, the points may be connected. In some embodiments, the size or color of the edge may suggest the number of shared relationships between the points.

Group 1004 is separated from the rest of the points. In some embodiments, the points in group 1004 may not share any independent and/or dependent variables with the rest of the points. Since group 1004 is not coupled to the rest of the points, group 1004 may not move when a point of the larger grouped is pulled.

In various embodiments, the group 1004 may move when the larger group is moved because of the movement of one or more antigravity points. As discussed herein, the adjustment module 614 may select one or more points throughout the graph "antigravity" points. All other points in the graph may act as though an edge couples each non-antigravity points with one or more antigravity points. As such, when the antigravity points move (e.g., by a user moving one or more points), even an otherwise uncoupled point may move as well. Alternately, since the points and edges of group 1004 are not coupled to the larger group, a movement of the larger group may not effect the forces and/or placement of group 1004.

Figure 10B:
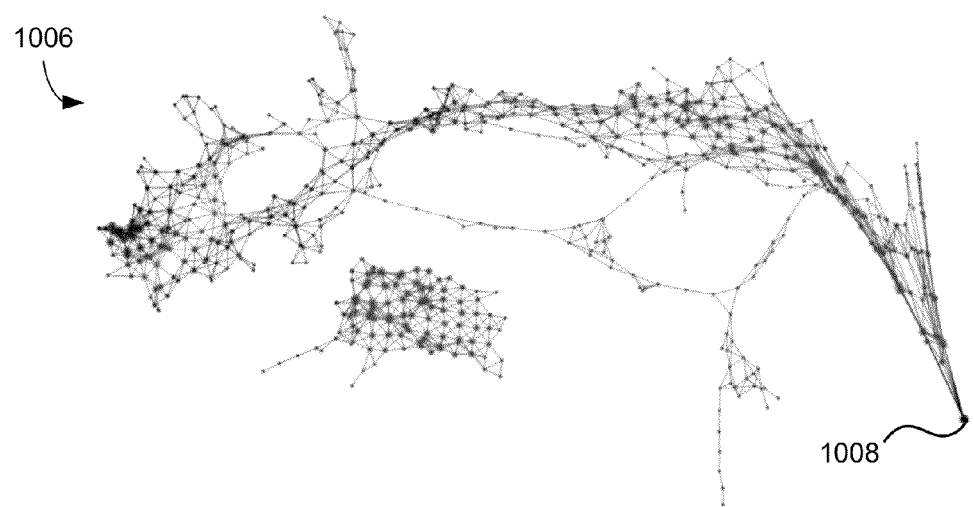
FIG. 10b is the graph layout wherein a node of the graph is pulled by a user in some embodiments.

FIG. 10*b* is the graph layout 1006 wherein a point 1008 of the graph is pulled by a user in some embodiments. The user may select any number of points, any number of edges, or a combination of points and edges. The user may move the selected objects (e.g., the points and/or edges). In one example, the user utilizes an I/O device such as a mouse to select and move the points and/or edges. In FIG. 10*b*, the user may move only a single point 1008. As the user drags the point, all points and edges that are directly coupled to the moved point 1008 may also move (e.g., are dragged).

In some embodiments, the rest of the graph that may not be directed effected otherwise as a result of the movement may not adjust to the movement (if at all) until after the user has completed the movement. Alternately, one or more points in the graph may move as the user moves point 1008 (e.g., the points and/or edges of the graph may be moved and/or adjusted as the user moves point 1008.

In FIG. 10*b*, it may be noticed that the graph layout 1006 may undergo small changes as a result of the user's movement of point 1008. For example, "holes" as depicted in the data may squeeze shut or otherwise disappear as the graph is moving. Although the left side of the graph may have few changes between FIGS. 10*a* and 10*b*, changes may be more pronounced depending on proximity to the user's movement.

Figure 10C:
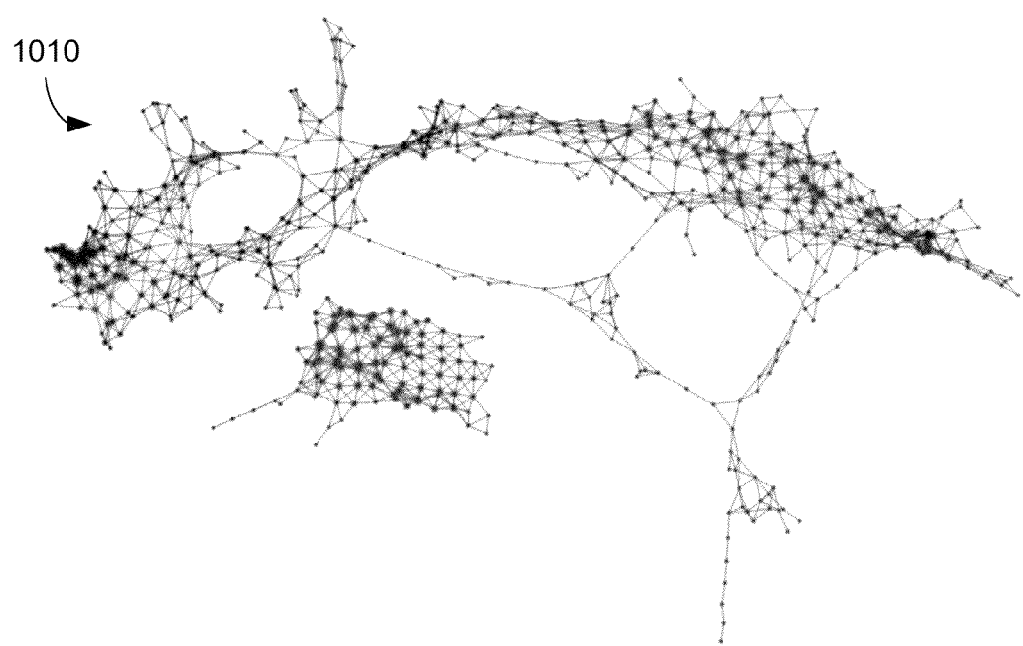
FIG. 10c if the graph layout after adjusting to the new position over time in some embodiments.

FIG. 10*c* if the graph layout 1010 after adjusting to the new position over time in some embodiments. The right side of the graph layout 1010 may be significantly altered as a result of the user's movement of the point 1008. In one example, the user moves the point down and to the right of the graph before the user pulls the point 1008 back upwards. Points immediately or proximately coupled with the point 1008 may also have pronounced movement. Points which are farther away or unconnected may not be affected.

In some embodiments, user movements of points and/or edges are not altered. Rather, the user may place the points and/or edges in a specific location. Rather than reorganizing or repositioning the points and/or edges moved by the user, the adjustment module 614 may adjust the points and balls around the new position.

Figure 11:
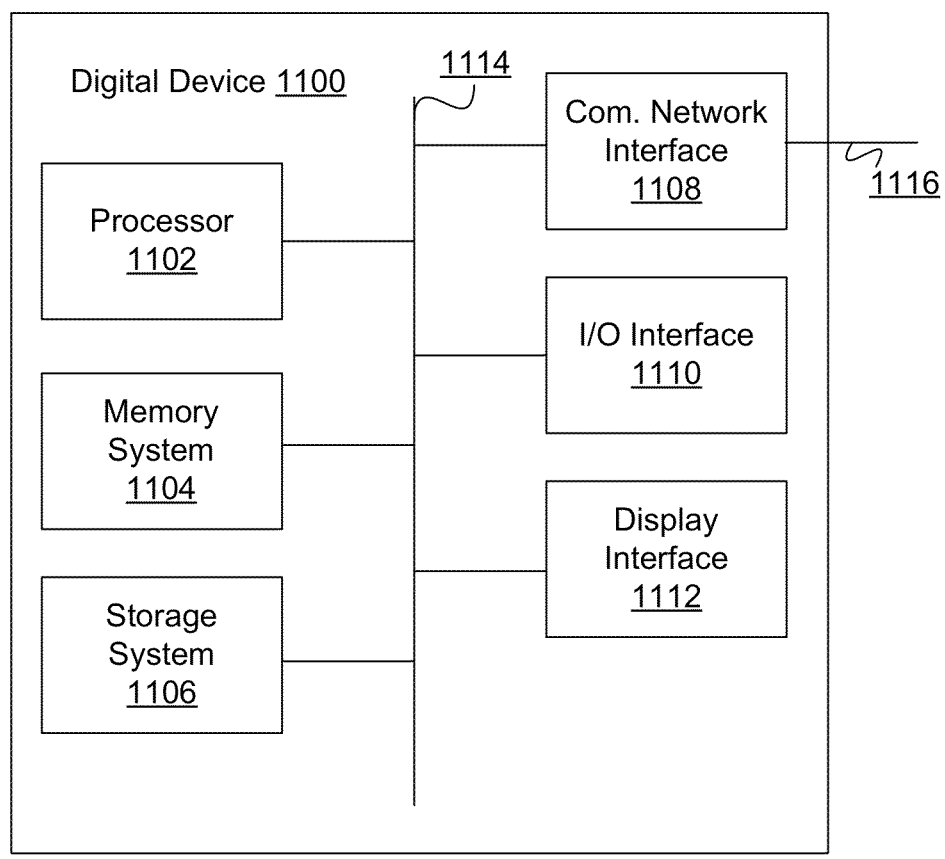
FIG. 11 is a block diagram of an exemplary digital device.

FIG. 11 is a block diagram of an exemplary digital device 1100. The digital device 1100 comprises a processor 1102, a memory system 1104, a storage system 1106, a communication network interface 1108, an I/O interface 1110, and a display interface 1112 communicatively coupled to a bus 1114. The processor 1102 is configured to execute executable instructions (e.g., programs). In some embodiments, the processor 1102 comprises circuitry or any processor capable of processing the executable instructions.

The memory system 1104 is any memory configured to store data. Some examples of the memory system 1104 are storage devices, such as RAM or ROM. The memory system 1104 can comprise the ram cache. In various embodiments, data is stored within the memory system 1104. The data within the memory system 1104 may be cleared or ultimately transferred to the storage system 1106.

The storage system 1106 is any storage configured to retrieve and store data. Some examples of the storage system 1106 are flash drives, hard drives, optical drives, and/or magnetic tape. In some embodiments, the digital device 1100 includes a memory system 1104 in the form of RAM and a storage system 1106 in the form of flash data. Both the memory system 1104 and the storage system 1106 comprise computer readable media which may store instructions or programs that are executable by a computer processor including the processor 1102.

The communication network interface (com. network interface) 1108 can be coupled to a network (e.g., communication network 114) via the link 1116. The communication network interface 1108 may support communication over an Ethernet connection, a serial connection, a parallel connection, or an ATA connection, for example. The communication network interface 1108 may also support wireless communication (e.g., 802.11 a/b/g/n, WiMax). It will be apparent to those skilled in the art that the communication network interface 1108 can support many wired and wireless standards.

The optional input/output (I/O) interface 1110 is any device that receives input from the user and output data. The optional display interface 1112 is any device that is configured to output graphics and data to a display. In one example, the display interface 1112 is a graphics adapter. It will be appreciated that not all digital devices 1100 comprise either the I/O interface 1110 or the display interface 1112.

It will be appreciated by those skilled in the art that the hardware elements of the digital device 1100 are not limited to those depicted in FIG. 11. A digital device 1100 may comprise more or less hardware elements than those depicted. Further, hardware elements may share functionality and still be within various embodiments described herein. In one example, encoding and/or decoding may be performed by the processor 1102 and/or a co-processor located on a GPU (i.e., Nvidia).

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A method comprising:
receiving graphical data associated with points and edges;
selecting a first predetermined number of points of the received graphical data;
determining an initial distance for each of the first predetermined number of points relative to other points of the first predetermined number of points;
generating a fast approximate distance oracle comprising identifiers for at least a plurality of points of the received graphical data and oracle distances between at least one point associated with an identifier and at least one other point, the oracle distances including the initial distance between members of the first predetermined number of points;
selecting a second predetermined number of points of the received graphical data;
determining a first graphical distance between each of the second predetermined number of points and the first predetermined number of points utilizing, at least in part, the fast approximate distance oracle;
determining a second graphical distance between each of the second predetermined number of points and other points of the second predetermined number of points utilizing, at least in part, the fast approximate distance oracle;
calculating a first potential error between the determined first graphical distance and a first topologic distance between each of the second predetermined number of points and the first predetermined number of points;
calculating a second potential error between the determined second graphical distance and a second topologic distance between each of the second predetermined number of points and the other points of the second predetermined number of points;
approximating a correction for at least one point of the second predetermined number of points based on at least one of the calculated first potential error or the second potential error;
adjusting a position of the at least one point of the second predetermined number of points based on at least one of the determined first graphical distance or the determined second graphical distance and the correction; and
displaying the at least one point of the second predetermined number of points in the adjusted position.

2. The method of claim 1, wherein generating the fast approximate distance oracle occurs simultaneously or near-simultaneously with determining the initial distance for each of the first predetermined number of points relative to other points of the first predetermined number of points.

3. The method of claim 1, wherein generating the fast approximate distance oracle occurs prior to determining the initial distance for each of the first predetermined number of points relative to other points of the first predetermined number of points.

4. The method of claim 1, wherein selecting the first predetermined number of points comprises selecting each point of the first predetermined number of points based, at least in part, on the initial distance between points identified in the received graphical data.

5. The method of claim 1, wherein selecting the first predetermined number of points comprises selecting each point of the first predetermined number of points randomly from the received graphical data.

6. The method of claim 1, wherein calculating the first potential error between the first graphical distance and the first topologic distance comprises determining a KK potential between the at least one point of the second predetermined number of points and the first predetermined number of points.

7. The method of claim 6, wherein approximating the correction for the at least one point of the second predetermined number of points comprises calculating a gradient descent to minimize the KK potential.

8. The method of claim 1, further comprising:
identifying a first subset of antigravity points associated with the at least one point of the second predetermined number of points;
identifying edges associated with the at least one point of the second predetermined number of points;
calculating forces associated with the first subset of antigravity points and forces associated with the edges that act upon the at least one point of the second predetermined number of points; and
adjusting the position of the at least one point of the second predetermined number of points based on the force calculation.

9. The method of claim 8, further comprising:
identifying a second subset of antigravity points associated with at least one other point of the second predetermined number of points;
identifying edges associated with the at least one other point of the second predetermined number of points;
calculating forces associated with the second subset of antigravity points and forces associated with the edges that act upon the at least one other point of the second predetermined number of points; and
adjusting the position of the at least one other point of the second predetermined number of points based on the force calculation.

10. The method of claim 9, wherein the first subset of antigravity points comprises at least one point that is not a member of the second subset of antigravity points.

11. The method of claim 8, wherein none of the points of the first subset of antigravity points are coupled to the at least one point of the second predetermined number of points by an edge.

12. A system comprising:
a data acquisition module configured to receive graphical data associated with points and edges;
a point selection module configured to select a first predetermined number of points of the received graphical data and to select a second predetermined number of points of the received graphical data;
a hierarchical model module configured to determine an initial distance for each of the first predetermined number of points relative to other points of the first predetermined number of points and to generate a fast approximate distance oracle comprising identifiers for at least a plurality of points of the received graphical data and oracle distances between at least one point associated with an identifier and at least one other point, the oracle distances including the initial distance between members of the first predetermined number of points;
a distance correction module configured to determine a first graphical distance between each of the second predetermined number of points and the first predetermined number of points utilizing, at least in part, the fast approximate distance oracle and determine a second graphical distance between each of the second predetermined number of points and other points of the second predetermined number of points utilizing, at least in part, the fast approximate distance oracle, to calculate a first potential error between the determined first graphical distance and a first topologic distance between each of the second predetermined number of points and the first predetermined number of points and calculate a second potential error between the determined second graphical distance and a second topologic distance between each of the second predetermined number of points and the other points of the second predetermined number of points, to approximate a correction for at least one point of the second predetermined number of points based on at least one of the calculated first potential error or the second potential error, and to adjust a position of the at least one point of the second predetermined number of points based on at least one of the determined first graphical distance or the determined second graphical distance and the correction; and
a layout module configured to display the at least one point of the second predetermined number of points in the adjusted position.

13. The system of claim 12, wherein the hierarchical model module is configured to generate the fast approximate distance oracle simultaneously or near-simultaneously with determining the initial distance for each of the first predetermined number of points relative to the other points of the first predetermined number of points.

14. The system of claim 12, wherein the hierarchical model module is configured to generate the fast approximate distance oracle prior to determining the initial distance for each of the first predetermined number of points relative to the other points of the first predetermined number of points.

15. The system of claim 12, wherein the point selection module configured to select the first predetermined number of points comprises the point selection module configured to select each point of the first predetermined number of points based, at least in part, on the initial distance between points identified in the received graphical data.

16. The system of claim 12, wherein the point selection module configured to select the first predetermined number of points comprises the point selection module configured to select each point of the first predetermined number of points randomly from the received graphical data.

17. The system of claim 12, wherein the distance correction module configured to calculate the potential error between the graphical distance and the topologic distance comprises the distance correction module configured to determine a KK potential between the at least one point of the second predetermined number of points and the first predetermined number of points.

18. The system of claim 17, wherein the distance correction module configured to approximate the correction for the at least one point of the second predetermined number of points comprises the distance correction module configured to calculate a gradient descent to minimize the KK potential.

19. The system of claim 12, further comprising:

an adjustment module configured to identify a first subset of antigravity points associated with the at least one point of the second predetermined number of points, to identify edges associated with the at least one point of the second predetermined number of points, to calculate forces associated with the first subset of antigravity points and forces associated with the edges that act upon the at least one point of the second predetermined number of points, and to adjust the position of the at least one point of the second predetermined number of points based on the force calculation.

20. The system of claim 19, wherein the adjustment module is further configured to identify a second subset of antigravity points associated with at least one other point of the second predetermined number of points, to identify edges associated with the at least one other point of the second predetermined number of points, to calculate forces associated with the second subset of antigravity points and forces associated with the edges that act upon the at least one other point of the second predetermined number of points, and to adjust the position of the at least one other point of the second predetermined number of points based on the force calculation.

21. The system of claim 20, wherein the first subset of antigravity points comprises at least one point that is not a member of the second subset of antigravity points.

22. The system of claim 19, wherein none of the points of the first subset of antigravity points are coupled to the at least one point of the second predetermined number of points by an edge.

23. A non-transitory computer readable medium comprising instructions, the instructions being executable by a processor for performing a method, the method comprising:

receiving graphical data associated with points and edges;

selecting a first predetermined number of points of the received graphical data;

determining an initial distance for each of the first predetermined number of points relative to other points of the first predetermined number of points;

generating a fast approximate distance oracle comprising identifiers for at least a plurality of points of the received graphical data and oracle distances between at least one point associated with an identifier and at least one other point, the oracle distances including the initial distance between members of the first predetermined number of points;

selecting a second predetermined number of points of the received graphical data;

determining a first graphical distance between each of the second predetermined number of points and the first predetermined number of points utilizing, at least in part, the fast approximate distance oracle;

determining a second graphical distance between each of the second predetermined number of points and other points of the second predetermined number of points utilizing, at least in part, the fast approximate distance oracle;

calculating a first potential error between the determined first graphical distance and a first topologic distance between each of the second predetermined number of points and the first predetermined number of points;

calculating a second potential error between the determined second graphical distance and a second topologic distance between each of the second predetermined number of points and other points of the second predetermined number of points;

approximating a correction for at least one point of the second predetermined number of points based on at least one of the calculated first potential error or the second potential error;

adjusting a position of the at least one point of the second predetermined number of points based on at least one of the determined first graphical distance or the determined second graphical distance and the correction; and displaying the at least one point of the second predetermined number of points in the adjusted position.

\* \* \* \* \*